United States Patent [19]

Berlincourt et al.

[11] 3,736,446
[45] May 29, 1973

[54] PIEZOELECTRIC TRANSFORMER
[75] Inventors: Don A. Berlincourt, Chagrin Falls; Lawrence S. Sliker, Shaker Heights, both of Ohio
[73] Assignee: Vernitron Corporation, Bedford, Ohio
[22] Filed: Oct. 27, 1970
[21] Appl. No.: 84,350

Related U.S. Application Data

[60] Continuation-in-part of Ser. Nos. 651,875, July 7, 1967, abandoned, and Ser. No. , , Division of Ser. No. 734,416, June 4, 1968, Pat. No. 3,562,792.

[52] U.S. Cl. .....................310/8, 252/62.9, 310/8.1, 310/9.5, 310/9.7, 310/9.8, 333/72
[51] Int. Cl. ..................................................H01v 7/00
[58] Field of Search....................310/8.1, 9.7, 9.5, 310/9.8

[56] References Cited

UNITED STATES PATENTS

| | | | |
|---|---|---|---|
| 2,974,296 | 3/1961 | Rosen | 310/9.8 X |
| 3,598,909 | 8/1971 | Sasaki | 310/8.1 X |
| 3,657,579 | 4/1972 | Kramer | 310/9.8 X |
| 3,659,127 | 4/1972 | Kumon | 310/8.1 X |

*Primary Examiner*—J. D. Miller
*Assistant Examiner*—Mark O. Budd
*Attorney*—Eber J. Hyde

[57] ABSTRACT

A body of ceramic piezoelectric material of the lead titanate, lead zirconate type with an additive of the iron oxide type is provided having regions electroded and polarized such that the electrical impedances are markedly different. High voltage transformations are obtained in this manner between input and output electrodes. A third set of electrodes coupled to one of the other sets of electrodes enables the transformer to accomplish self-oscillation. In order to enable the body to be supported at more than one vibration node, the body is caused to vibrate at a harmonic of its fundamental frequency of vibration or more precisely in a mode with one full acoustic wavelength along the ceramic body, or two or more half wavelengths.

2 Claims, 15 Drawing Figures

Patented May 29, 1973 3,736,446

PIEZOELECTRIC TRANSFORMER

This is a continuation-in-part of application Ser. No. 651,875, filed on July 7, 1967 for a Piezoelectric Transformer, now abandoned, and is a division of application Ser. No. 734,416, filed June 4, 1968, now U.S. Pat. No. 3,562,792, for Piezoelectric Transformer.

The term piezoelectric transformer is here applied to a passive electrical energy-transfer device or transducer employing the piezoelectric properties of a material to achieve the transformation of voltage or current or impedance. It is an object of the invention to provide a piezoelectric transformer which is not only capable of substantial transformation ratios but in which relatively high power may be transferred in relation to the size of the unit.

It is a further object of the invention to provide a piezoelectric transformer which may be easily and inexpensively produced.

It is a further object of the invention to provide a piezoelectric transformer capable of production of high voltages and which may safely be used in high voltage circuits.

Other and further objects, features and advantages of the invention will become apparent as the description proceeds.

The ceramic body employed in the piezoelectric transformer may take various forms or configurations such as rings, flat slabs and the like. A typical example of a mode of carrying out the invention is in conjunction with the use of a flat slab which is appreciably longer than it is wide and substantially wider than thick. In this form of the invention, longitudinal vibration is caused to take place. In one portion of the slab, driving electric field is parallel to the mechanical stress, and in the remaining portion of the slab there may be a different relationship between the electrical field and mechanical stress. The driving field may be transverse, i.e., perpendicular to strain in one region and parallel to strain in another. Assuming that driving field is transverse in one portion, electrodes are placed on opposite faces of the slab in that portion of the slab and another electrode is place at the opposite end of the slab so that in conjunction with the electrodes of the transversely driven portion of the slab a voltage may be taken off or applied at a frequency corresponding to that of the longitudinal mode of vibration of the slab.

Proposals have heretofore been made such as in Rosen Pat. No. 2,830,274 for example, that voltage transformation be accomplished by polarization of a ceramic piezoelectric body in more than one orientation. In practice, however, heretofore it has not been possible to obtain sufficient power output or to enable such devices to be operated at sufficiently high voltages to be of practical or commercial value or to constitute much more than laboratory curiosities. It has been found on the other hand in accordance with the present invention that by the utilization of a ceramic body of the requisite composition and physical properties, not only may high voltage transformation be achieved, but adequately high power may be handled and the device may be utilized in high voltage circuits such as in television equipment, for example, as well as other circuits. The appropriate properties may be produced, we have found, in a ceramic body of the lead titanate, lead zirconate type in which there is addition agent of approximately 2.4 atomic percent of iron.

Another problem that has militated against the practical use of ceramic piezoelectric transformers has been the difficulty of mounting such units. However, in accordance with the present invention, mounting is readily accomplished by the utilization of soft resilient posts attached at two different vibration nodes of the body and operating the body at a frequency which constitutes a harmonic of its lowest natural frequency of vibration so that there will be at least two vibration nodes.

A better understanding of the invention will be afforded by the following detailed description considered in conjunction with the accompanying drawings in which:

In FIG. 1, one portion of the piezoelectric slab is polarized longitudinally.

Like reference characters are utilized throughout the drawing to designate like parts.

Figure 1:
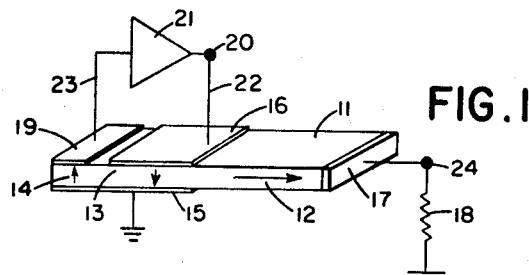
FIG. 1 is a perspective schematic diagram of an embodiment of the invention in the form of a flat slab-type piezoelectric transformer with a feed-back connection to a self-oscillating amplifier driving the primary of the transformer.

As shown in FIG. 1, a piezoelectric body 11 is employed having different portions polarized differently. In the case of FIG. 1, the piezoelectric body 11 is in the form of a flat slab which is considerably wider than it is thick, and having greater length than width. A substantial portion of the slab 11, the portion 12 to the right of the center of the slab is polarized longitudinally, whereas the remainder of the slab is polarized transversely to the plane of the face of the slab. In this case the remainder of the slab is actually divided into two portions, one portion 13 being polarized transversely in one direction, and the remainder of the left half of the slab, the portion 14 also being polarized transversely but in the direction opposite to the direction of polarization in the portion 13.

In order that electrical voltages may be related to mechanical stress in the slab 11, electrodes are provided. If desired, there may be a common electrode 15, shown as grounded. For the primary connection and for relating voltage at opposite faces of the transversely polarized portion 13 of the slab 11, there is an electrode 16 opposite the common electrode 15. For relating voltages to stress generated in the longitudinal direction of the slab 11, there is a secondary or high-voltage electrode 17 cooperating with the common electrode 15. The electrode 17 is shown as connected to a terminal 24 of an output load 18 grounded at its opposite end.

In the arrangement illustrated, a voltage applied between the electrodes 15 and 16 is stepped up to a high voltage between the electrodes 15 and 17 for supplying the load 18 at a much higher voltage than that applied between the electrodes 15 and 16.

However, if self-oscillation is desired, an additional secondary is provided which may take the form of an additional electrode 19 opposite the left end portion of common electrode 15 on the transversely polarized portion 14 of the slab 11. An amplifier 21 is provided with an output connection 22 to the output terminal 20 of the primary electrode 16 and input connection 23 to the second secondary or feed-back or tertiary electrode 19.

The end electrode 17 is connected to a high-voltage terminal 24 to which the load 18 is connected.

Preferably the portion 14 of the slab 11 on which the second secondary electrode 19 is mounted is integral with the remainder of the slab. However, the invention is not limited thereto and does not exclude the use of another ceramic element bonded to the main transformer at an appropriate place.

Piezoelectric transformers heretofore available have been subject to overheating and cracking and have required that the output fields be kept relatively low, of the order of 0.2 kV/cm., for example. We have found, however, that by the use of a piezoelectric body composed of lead titanate, lead zirconate, prepared in the manner described in U.S. Pat. No. 3,068,177 to Sugden, in solid solution with an addition agent of approximately 2.4 atomic percent iron, approximately 3 kV/cm. r.m.s. may be generated. An alkaline earth metal such as calcium or strontium, for example, is substituted for a portion of the lead. A preferred solid solution is represented by the formula

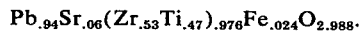

The primary single factor in limiting the voltage per unit length in the output section of a piezoelectric transformer is the mechanical loss due to strain-stress hysteresis. The reciprocal of the mechanical loss factor $\tan\delta_M$ is the familiar mechanical quality factor $Q_M$. $Q_M$ enters in two ways. First, the step-up voltage $V_{out}/V_{in}$ is directly proportional to $Q_M$ when the secondary is open-circuited. With a load connected, the step-up is decreased, but it is still a monotonic function of $Q_M$. The second factor is that power mechanically dissipated in the transformer is directly proportional to $1/Q_M$. With the usual range of loads for the piezoelectric transformer the mechanically dissipated power $P_{DM}$ is given approximately by (1) $\quad P_{DM} = \text{Vol}\,(T^2/Y)\,(2\pi f/Q_M),$ where $T$ is the rms value of the space average of the absolute value of the dynamic stress in the transformer in $N/M^2$, Vol is the volume of the transformer in meters$^3$, $Y$ is the average Young's modulus in $N/m^2$, $f$ is the frequency in Hz, $P_{DM}$ is in watts, and $N$ is a force in Newtons.

In most ranges of secondary load, if we neglect stray capacitance across the secondary terminals, the stress T and voltage $V_{out}$ are related approximately as follows:

(2) $\quad V_{out} = g_{33} l T,$ where $g_{33}$ is the piezoelectric constant relating electric field parallel to the number 3 axis to strain parallel to the same axis $[g_{33} = -(\delta E_3/\delta T_3)_D 9$ in V m/N and $l$ is the length of the output section in meters. T is the rms of the space average dynamic stress (N/m$^2$) as before, and $V_{out}$ is in rms volts.

It is thus seen that a high value of $Q_M$ is important so that $P_{DM}$ is minimized and the transformer can be driven to high levels of stress T without heat due to high mechanically dissipated power $P_{DM}$ causing deleterious effects.

Figure 9:
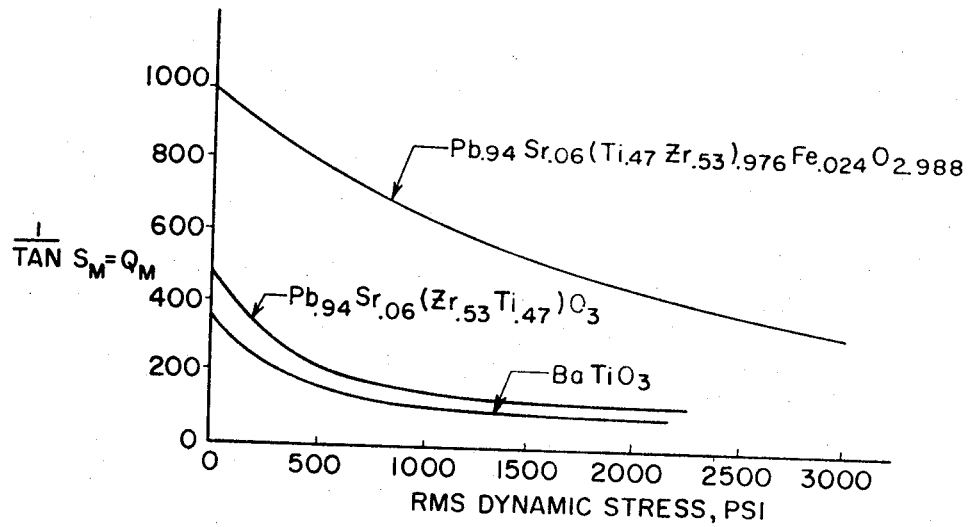
FIG. 9 is a graph showing the relationship between mechanical quality factor $Q_M$, plotted vertically and RMS dynamic stress, plotted horizontally for different ceramic materials with piezoelectric properties.

With ferroelectric ceramics, which are for obvious reasons the only piezoelectric materials considered for use as high voltage piezoelectric transformers, ferroelectric domain effects cause $Q_M$ to decrease with increasing stress. Therefore as the input voltage is increased and the dynamic stress T increases $Q_M$ decreases, the ratio $V_{out}/V_{in}$ decreases, and $P_{DM}$ increases at a rate more than proportional to $T^2$. FIG. 9 shows $Q_M$ as a function of rms dynamic stress for BaTiO$_3$, for Pb$_{.94}$Sr$_{.06}$(Zr$_{.53}$Ti$_{.47}$O)$_3$, and for Pb$_{.94}$Sr$_{.06}$(Zr$_{.53}$Ti$_{.47}$)$_{.976}$Fe$_{.024}$O$_{2.988}$. These curves illustrate very well why the last named composition can be used to generate output voltages of 2 to 3 kV per cm length of the output section, an order of magnitude more than for BaTiO$_3$ and well over twice as high as for Pb$_{.94}$Sr$_{.06}$(Zr$_{.53}$Ti$_{.47}$)O$_3$.

Figure 10:
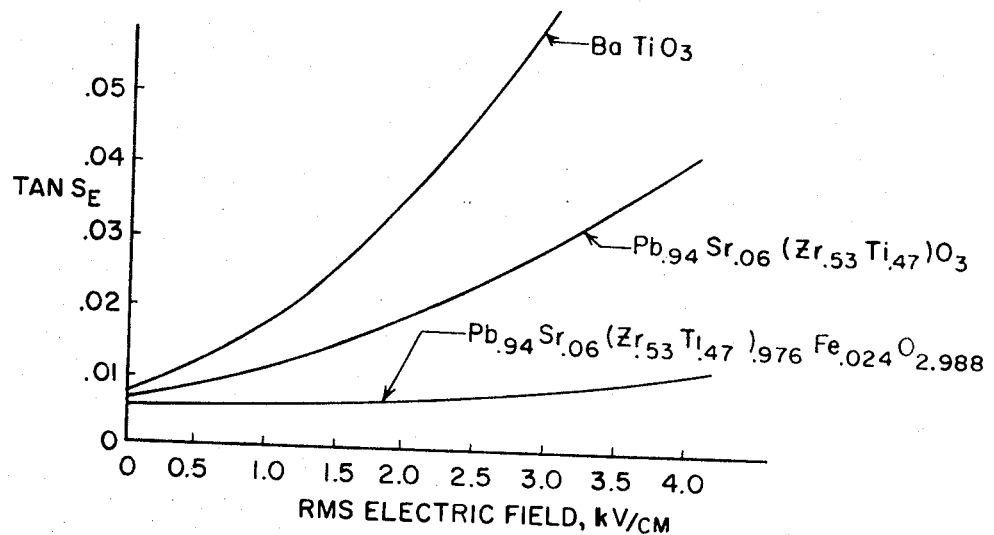
FIG. 10 is a graph showing the relationship between $\tan_E$ and RMS electric field for the same materials.

Another source of dissipation in piezoelectric transformers is charge-field hysteresis in the output section. The dielectric loss factor $\tan\delta_E$ is the reciprocal of the electrical quality factor $Q_E$. The dielectrically dissipated power $P_{DE}$ is given by $$(3) \quad P_{DM} V_0(E_0^2 \epsilon)(2\pi f \tan \Delta_{E_0})$$
$$+ V_i(E_i^2 \epsilon)(2\pi f \tan \delta_{E_i}),$$

where $V_o$ and $V_i$ are the volumes of the output and input sections respectively in $m^3$, $E_o$ and $E_i$ are the rms values of the space average output and input electric fields in volts/m, $f$ is the frequency in Hz, and $\tan\delta_{E_o}$ and $\tan\delta_{E_i}$ are the dielectric loss factors in the output and input sections. In usual operating ranges $E_o$ is five to ten or more times higher than $E_i$. Furthermore, since $\tan\delta_E$ increases with E, $\tan\delta_{E_o} > \tan\delta_{E_i}$. The second term in equation (3) may therefore for all practical purposes be neglected. It is immediately evident also that $P_{DE}$ increases at a rate more than proportional to $E_o^2$. FIG. 10 shows $\tan_E$ as a function of rms electric field for $BaTiO_3$, for $Pb_{.94}Sr_{.06}(Zr_{.53}Ti_{.47})O_3$ and for $Pb_{.94}Sr_{.06}(Zr_{.53}Ti_{.47})_{.976}Fe_{.024}O_{2.988}$. These curves show clearly that $P_{DE}$ is considerably lower for the last named composition.

The total input power $P_i$, the delivered power $P_{Del}$, and the dissipated power $P_{DE}+P_{DM}$ are related as follows:

$$(4) \quad P_i = P_{Del} + P_{DE} + P_{DM}.$$

Efficiency is given as follows:

$$\text{Effic.} = (P_{Del}/P_i)$$

It is seen that, with a given output load, efficiency is a function of amplitude, and that efficiency is highest at all amplitudes for the $Pb_{.94}Sr_{.06}(Zr_{.53}Ti_{.47})_{.976}Fe_{.024}O_{2.988}$ composition. Furthermore efficiency decreases with amplitude increase, but this decrease is by far least with this composition.

Considerably more important from a practical standpoint is the heat rise due to internally dissipated power $P_{DE}+P_{DM}$ in the transformer. Since thermal characteristics of these compositions are similar, it can readily be seen that limitation of temperature rise to a certain value requires limitation of amplitude of output electric field to that giving about the same value of $P_{DM}+P_{DE}$ for each of the three compositions. It should be noted that since the Curie point for $BaTiO_3$ is in the range near 120°C compared to the range near 300°C for the other compositions, the temperature rise is required to be smaller with $BaTiO_3$. A further factor is that with $BaTiO_3$ high amplitude values of $\tan\delta_M$ and $\tan\delta_E$ increase with increasing temperature. $\tan\delta_M$ (but not $\tan\delta_E$) increases with increasing temperature also with the other compositions, but much less so, especially with $Pb_{.94}Sr_{.06}(Zr_{.53}Ti_{.47})_{.976}Fe_{.024}O_{2.988}$. These factors all combine to allow generation of markedly higher electric field in the output section of the $Pb_{.94}Sr_{.06}(Zr_{.53}Ti_{.47})_{.976}Fe_{.024}O_{2.988}$ composition.

Figure 11:
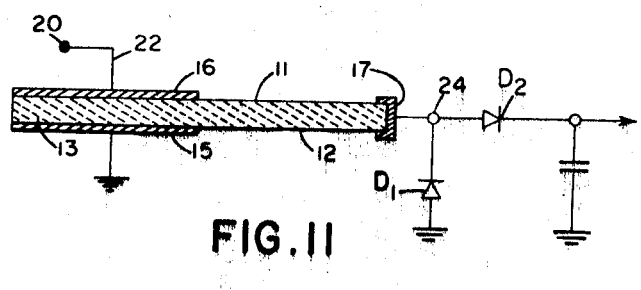
FIG. 11 is a diagram of a piezoelectric transformer in accordance with the invention connected to a voltage doubler.

From a practical standpoint this is extremely important. A factor of two increase in output electric field, for instance, means that the element can be only one-half as long. With the same lateral dimensions this means that the output capacitance will be twice as great. This is important for two reasons. First the output load can be greater without marked increase in operating dynamic stress. In usual operating ranges this is considerably less important than the second factor. This factor is the influence of stray capacitance. If ac power is delivered by the output section this capacitance consists of wiring capacitance and any stray capacitance directly across the load. When dc power is to be delivered, the diode $D_1$ in a conventional voltage doubler has a capacitance which presents a stray capacitance across the transformer output. If we call $C_o$ the output capacitance of the transformer and $C_s$ the stray capacitance in the circuit of FIG. 11, the operating stress for usual loads is increased by the approximate ratio $(C_o+C_s)/C_o$. Since the mechanically dissipated power increases by a factor greater than $T^2$ as shown before, this constitutes a severe problem. If lateral dimensions are increased to keep $C_o$ the same for the inferior material (assumed $E_o$ only one-half as great) then the volume is four times as great and $P_{DM}$ four times as great. The premium from a practical standpoint on the characteristics illustrated in FIGS. 9 and 10 is thus clear. The device becomes most useful with compositions having characteristics similar to or better than the $Pb_{.94}Sr_{.06}(Zr_{.53}Ti_{.47})_{.976}Fe_{.024}O_{2.988}$ compositions.

The advantage of the preferred composition is believed to arise from the presence of chemical elements acting as acceptors rather than donors, as the substituted material and as the addition agent.

$Pb(Zr_{1-x}Ti_x)O_3$ has the perovskite structure $ABO_3$ in which $Pb^{2+}$ occupies the A position and $Zr^{4+}$ and $Ti^{4+}$ share the B position. If a small five-valent element such as $Nb^{5+}$ enters the lattice at the B position, it has been found that characteristics illustrated in FIGS. 9 and 10 are very markedly degraded. The same occurs if a large three-valent element such as $La^{3+}$ enters the lattice at the A position. In these cases the substituent, termed a donor, creates lattice vacancies in the A position (lead vacancies). These favor nonlinear (lossy) effects by encouraging lossy domain wall motion contributions to permittivity and compliance. It has more recently been demonstrated that substitution of small trivalent elements such as $Fe^{3+}$ or $Sc^{3+}$ in the B position or large monovalent elements such as $K^{1+}$ in the A position cause directly opposite actions. These substituents, termed acceptors, act to tie down domain walls and thus minimize lossy domain wall contributions to permittivity and compliance. It is these materials which are particularly suited for use in piezoelectric transformers.

FIG. 1 illustrates an arrangement with two secondary circuits. The invention is not limited, however, to the use of only two secondaries and there is no limit other than practical to the number of secondaries which may be provided.

The invention is not limited to the use of a piezoelectric body which is transversely polarized in a portion thereof. There are some advantages in the use of a bar element poled only in the length direction or a ring poled only circumferentially as a piezoelectric transformer. Such an arrangement provides higher piezoelectric coupling in the low voltage part of the transformer.

Figure 2:
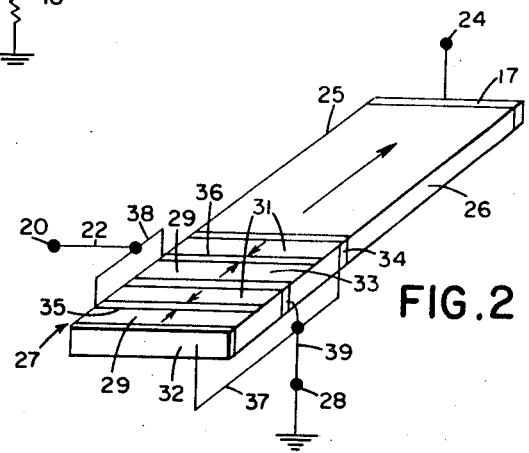
FIG. 2 is a schematic diagram in perspective of a flat slab-type transformer in accordance with the invention in which a piezoelectric slab is polarized longitudinally, with the portion of the transformer forming the primary being divided into parts polarized in opposite directions.

For example, as illustrated in FIG. 2 there is a slab 25 with a portion 26 lengthwise polarized for operation in conjunction with the high voltage electrode 17. The slab 25 has another portion 27 to which a low voltage input from a terminal 20 is applied. However, the portion 27 in this case is also longitudinally polarized, but divided into subdivisions or parts 29 polarized in the same direction as portion 26 and parts 31 polarized in the opposite direction, the subdivisions of opposite polarization being alternated with electrodes at the end of each subdivision.

There is an end electrode 32 applied to the end of the slab or body 25, an electrode 33 between the ends of portion 27 of the body and an electrode 34 at the junction between the portions 26 and 27 of the body 25. Correspondingly, there are electrodes 35 and 36 intermediate the pair of electrodes 32 and 33 and the pair of electrodes 33 and 34, respectively. The electrodes 32, 33, and 34 are connected together by conductors 37 and the conductor 39 to the ground terminal 28. In like manner, the electrodes 35 and 36 are connected together by conductors 38 to the opposite input terminal 20, through a lead 22. The terminal 28 may be grounded. It will be understood that in the specific arrangement illustrated, the high voltage output appears between the output terminal 24 and the ground lead 39.

When a voltage of suitable frequency is applied between the input terminals 20 and 28, the subdivisions 29 and 31 are set into oscillation in the direction of the length of the body 25. However, because of the arrangement of electrodes and their connections and polarization, successive subdivisions of the body 25 are strained in the same direction. The oscillation is transmitted mechanically to the portion 26 of the body 25. The strain or the deformation per unit length is substantially the same. But since the induced voltage is determined by the length of the body under stress as well as the potential gradient depending upon the stress at successive portions of the body, a much higher output voltage appears at the terminal 24 than the value of the input voltage at the terminal 20.

Figure 3:
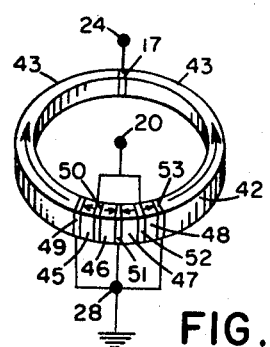
FIG. 3 is a schematic perspective diagram of an embodiment of the invention illustrating the manner of using annular piezoelectric bodies to form a transformer in accordance with the invention, the polarization being in the direction of arcs of the body with different arcs polarized in different directions.

Analogous to the arrangement of FIG. 2 is that of FIG. 3 in which there is an annular body 42 divided by a high voltage electrode 17 into two portions 43 in which circumferential stress may take place, but the remaining sector of the annulus 42 is divided into arcuate segments 45, 46, 47, and 48 by electrodes 49, 50, 51, 52 and 53. The portions 45 and 47 of the body are poled in one direction, and the portions 46 and 48 are poled in opposite direction. The input terminal 20 is connected to the electrode 50 between the body portions 45 and 46 and to the electrode 52 between the body portions 47 and 48. Likewise, the other input terminal, in this case the ground terminal 28, is connected to the electrode 49 adjacent to body portion 45, the electrode 51 between the body portions 46 and 47, and to the electrode 53 adjacent to body portion 48.

One of the advantages of a configuration with polarization parallel or anti-parallel only as in FIGS. 2 and 3 is that such configurations tend not to drive in the width mode. Second, and probably more important, lateral dimensions can be increased significantly without major cancellation effects. Greater lateral dimensions lead to higher output capacitance (and thus lower impedance) without loss of voltage step-up. This allows greater power transfer without loss of step-up.

With the arrangement of FIG. 1 increase of lateral dimensions much beyond a ratio of width over total length of 1 to 5 leads to considerable cancellation. The reason for this is that with very narrow bars the longitudinal vibration leads to a width stress which can essentially be neglected; in any case while the longitudinal strain is positive the width strain is negative (cross contraction). As the bar gets wider it tends to vibrate in a breathing mode (because $d_{31}=d_{32}$, the driving section tends to drive a planar mode); the width and length strains are then in phase. This is bad, since the voltage developed in the high voltage section is given by:

$$V_{out}=g_{33}T_3 dz+S_{31}T_2 dz$$

where $z$ is length, $T_3$ is stress when force is along the z-axis, length and $T_2$ is stress when force is along the y-axis, width. With $T_3$ and $T_2$ in phase, and noting that $g_{31}$—0.45 $g_{33}$, we get cancellation.

With the polarization parallel and anti-parallel only there is much less of a tendency for a breathing mode to develop, since the driving section depends on $d_{33}$ and at right angles $d_{31}$ is opposite. We know that driving of this type even with the width greater than the length results in deleterious effects which are weak. In the output section we have voltage developed again by the equation above, but since the driving section is different, $T_2$ will be out of phase with $T_3$. The electric field generated as a result of the width stress will therefore be additive. There is, however, still a slight advantage in a narrow geometry from the standpoint that a given excitation will give a higher value of $T_3$, but this is partially compensated by the fact that $d_{31}$ is negative and $T_2$ is out of phase in this case.

In the arrangement of FIG. 2 ratio of width to length of the body 25 may be greater or less than one.

In the arrangements of FIGS. 2 and 3, also, a feedback electrode may be applied and the ceramic material under this electrode may be poled either parallel to the length or perpendicular to it, or a separate element may be bonded.

Figure 15:
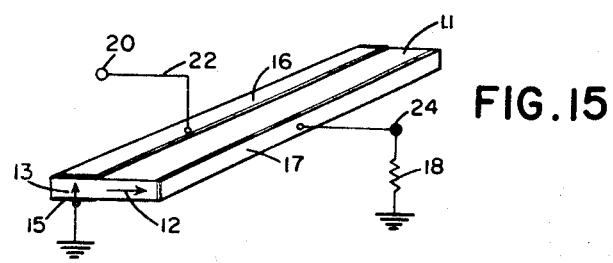

It must also be understood that, while the width in the arrangement of FIG. 1 must be substantially less than the length to prevent cancellation in the output section, it is possible also to utilize the width mode in an arrangement illustrated in FIG. 15.

A piezoelectric body 11 is employed having different sections polarized differently. In the case of FIG. 15, the piezoelectric body 11 is in the form of a flat slab which is considerably wider than it is thick and having greater length than width. A substantial portion of the slab 11, the portion 12 to the right of the center of the slab, with division parallel to the length, is polarized parallel to the width of the slab, whereas the remainder of the slab is poled transversely to the plane of the face of the slab. The electrodes 15, 16 and 17 and the terminals 20 and 24 are as described for FIG. 1. An advantage of the arrangement of FIG. 15 over that in FIG. 1 is that the output capacitance may be much higher for the arrangement of FIG. 15. For certain loads, this is an important consideration. Another consideration is that the effective electromechanical coupling factor is higher for this arrangement. In FIG. 1, the mechanical boundary condition at resonance is such that the only significant stress is that parallel to the length, but the body has mechanical displacement in all directions, with that parallel to the length far greater than that parallel to the width or thickness. In FIG. 15, the mechanical boundary condition at resonance is such that there is no significant stress parallel to the thickness and no significant strain parallel to the length. In FIG. 1, the fundamental length mode and its second harmonic are equally excited. In FIG. 15 the fundamental width mode or its second harmonic may be used. Feedback electrodes or multiple secondaries may be provided with either transformer type.

In accordance with the invention, a piezoelectric transformer may be operated at a harmonic of its lowest natural frequency of vibration instead of at its fundamental frequency of vibration. In fact, it is advantageous to do so because it greatly facilitates the mounting of the piezoelectric ceramic body. In order to obtain maximum amplitude of vibration and minimum loss, the piezoelectric body should be mounted at its vibration node. At a harmonic of the fundamental or lowest natural frequency of vibration, there is more than one vibration node or point in the body which does not move when the body is oscillated. In order to obtain mounting stability at minimum cost, the piezoelectric body is mounted at two different points at vibration modes.

Figure 4:
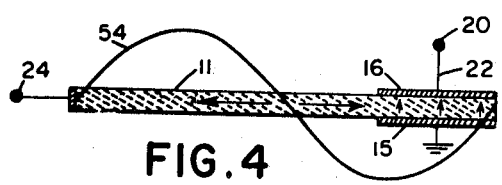
FIG. 4 is a diagram illustrating the distribution of stress in a piezoelectric transformer of the type illustrated in FIG. 1 with the piezoelectric body oscillating at the second harmonic of its lowest frequency of vibration.

FIG. 4 illustrates the stress distribution in a ceramic of the type illustrated in FIG. 1 when it is driven by the voltage applied to the input terminal 20 at a frequency which is double the lowest natural frequency of vibration of the slab 11 so that it vibrates at its second harmonic and there is a stress reversal at the center of the slab 11. The curve 54 in FIG. 4 is the stress distribution curve.

Figure 8:
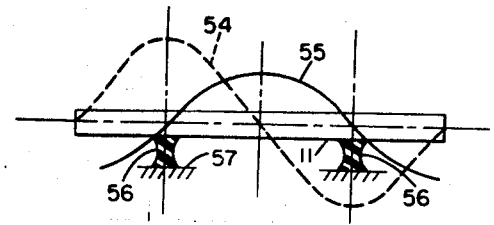
FIG. 8 is a diagram of a supporting arrangement.

The stress is necessarily zero at the free ends and, owing to the fact that vibration is at the second harmonic, the stress becomes zero again at about the center. Displacement, however, is proportional to the integral of the stress distribution curve 54 and is represented by the curve 55 in FIG. 8. The amplitude of vibration is a maximum at the ends and close to the center of the slab 11 when it is mounted to permit it to vibrate freely at the second harmonic of its lowest natural frequency of vibration. This is represented by the curve 55 in FIG. 8.

Since the nodes in the vibration curve 55 occur a quarter of the length of the slab 11 from each end, the slab 11 is supported at these two points. Slab 11 is secured to two posts 56, which in turn are secured to stationary brackets or a mounting table represented by the plane 57. Preferably the mounting posts or buttons 56 are composed of a natural or synthetic resilient substance such as soft rubber or the like, bonded to the slab 11 and to the structure providing the supporting plane 57.

Figure 5:
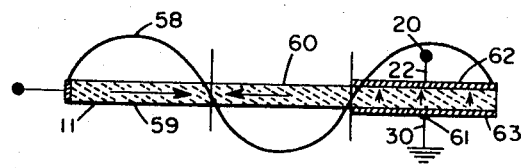
FIG. 5 is a diagram corresponding to FIG. 4 but illustrating the distribution of stress with the body oscillating at the third harmonic of its lowest natural frequency of vibration.

FIG. 5 with the stress distribution curve 58 represents the effect of causing the slab 11 to vibrate at the third harmonic of its lowest natural frequency of vibration. In this case the vibration nodes occur at the points 59, 60 and 61, the points of maximum stress. It will be understood that for symmetry in mounting, the supporting posts or members for the Unit FIG. 5 should be placed at the points 59 and 61.

When a ceramic body is oscillated at a harmonic of its lowest natural frequency of vibration, it is important also to make sure that the electrodes for producing transverse vibration do not extend in a longitudinal direction a distance beyond that at which a stress reversal takes place unless there is a corresponding reversal in transverse polarization. For example, as shown in FIG. 5, there are electrodes 62 and 63 connected between the input terminal 20 and a ground line 30. However, the electrodes 62 and 63 do not extend along the length of the slab 11 a greater distance than the distance between the two points of stress reversal or zero points on the curve 58 of FIG. 5.

It is not necessary, however, to make the electrodes cover the entire area of the portion of the slab subjected to stress in a given direction as illustrated in FIG. 5. For example, as shown in FIG. 4, electrodes may extend less than one-half the distance from the end to the middle of slab 11 when it is operating at the second harmonic. Even when the electrodes 15 and 16 extend for lesser distance, satisfactory operation is obtained.

Figure 6:
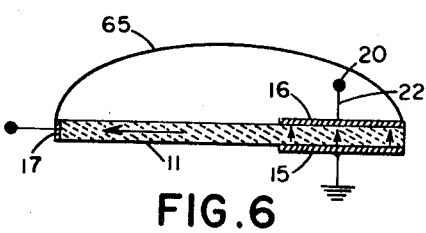
FIG. 6 is a diagram corresponding to FIGS. 4 and 5 but illustrating the distribution of stress with the piezoelectric body oscillating at its fundamental frequency of vibration.

FIG. 6 illustrates the use of electrodes 15 and 16 less than one-half the length the slab 11 although operation is at the fundamental frequency. To make the electrode a length less than one-half the length of the slab tends to promote operation at a higher harmonic.

FIG. 6 illustrates an arrangement in which the slab 11 has been driven at the fundamental frequency of vibration so that there are no reversals in stress and the stress curve is as shown at 65 in FIG. 6.

In a self-oscillating arrangement the construction of FIG. 6 would prefer to operate at a harmonic because the electrodes 15 and 16 are less than one-half the length of the slab 11.

Figure 7:
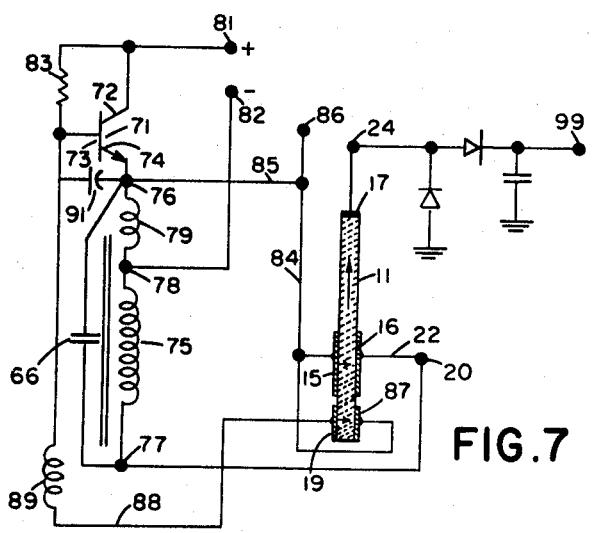
FIG. 7 is a circuit diagram of a typical transistor amplifier circuit for employment of a feed-back type piezoelectric transformer having a second secondary for feed-back connection.

FIG. 7 illustrates a suitable circuit for the amplifier 21 of FIG. 1. Although the invention is not limited to the use of a particular circuit, satisfactory results have been obtained by the circuit illustrated in FIG. 7. In this particular embodiment there is an NPN transistor 71 having a collector 72, a base 73, and an emitter 74, and a small step-up auto transformer 75 having a low voltage end terminal 76, a high voltage end terminal 77, and an intermediate tap 78 closer to the low voltage terminal 76. The transistor 71 is connected in series with the low voltage winding 79 of the transformer 75 between a positive terminal 81 and a negative terminal 82 of a source of direct current, the collector 72 being connected to the terminal 81 and the emitter 74 being connected to the transformer terminal 76.

A bias resistor 83 is connected between the collector 72 and the base 73.

Transverse polarization electrodes 15 and 16 for the primary of the piezoelectric ceramic transformer are connected to the terminals 76 and 77, respectively, of the transformer 75 at which the output voltage of the transistor amplifier 71 appears. The electrode 15 and the electrode 87 are connected through conductors 84 and 85 to the auto transformer terminal 76, the conductors 84 and 85 also being connected to one of the output terminals 86 of the unit. The other output terminal is 99 which is the output of a double diode doubler circuit connected to the high voltage terminal 24 which is connected to the end electrode 17 of the slab 11.

For feed-back coupling, the second secondary electrode 19 is connected through a conductor 88 and a radio frequency choke 89 to the base 73 of the transistor 71. A filter condenser 91 is connected between the emitter 74 and the base 73.

Ceramic piezoelectric transformers such as illustrated in the specification may be made to be resonant at a given frequency and at specific approximately harmonically related frequencies over a rather wide range. They may also be made to operate over a rather wide range of output voltage, with higher voltage generally requiring lower frequencies. These transformers are useful in video frequency circuits, for example, for use in television receivers where a light weight, compact, inexpensive unit is desired. Although the apparatus has been shown as designed to produce a step-up voltage operation, the invention is not limited to step-up transformers and is equally applicable for applications where step-down voltage transformation is desired.

The position of the feed-back electrode as well as an additional tuned circuit in the self-oscillating circuit can help in selecting the correct frequency for oscillation. One difficulty is that connection of a load to the secondary lowers the Q from the input terminals only for oscillation modes at which the transformer will deliver high secondary voltage. With devices illustrated in FIGS. 1, 2 and 4–7 of the application, the width mode would be favored. With the device of FIG. 3, the axial mode would be favored. Since these are rather far from the desired mode or modes in frequency it is possible to discriminate against these modes by other frequency selection networks as shown in FIG. 7.

It is, however, also possible to do so by proper placement of the feed-back electrodes or cemented feed-back element.

Figure 12:
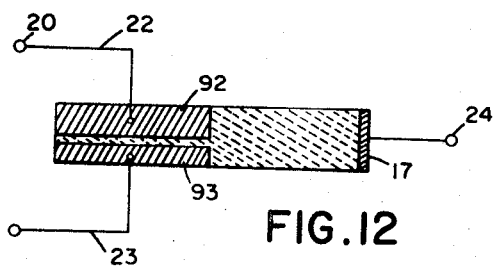
FIG. 12 is a top view of a modification in the arrangement of FIG. 11 in which a feed-back electrode is mounted beside the input electrode.

The arrangement illustrated in FIG. 12, which is a top view, will discriminate against this width mode. The input voltage is applied to the wide top-face electrode 92 and the feed-back is to the narrow 93 top-face electrode. Discrimination takes place because at the fundamental width mode the stress is sinusoidally distributed across the width and therefore very little voltage will be generated near the edge. In fact, only at high harmonics of the width mode will the average stress in that section be high.

Figure 14:
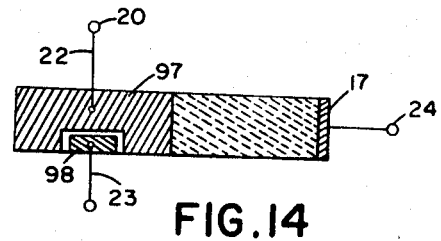
FIG. 14 is a corresponding view of an arrangement for promoting resonance with a full acoustic wave in the piezoelectric body and, FIG. 15 is a perspective schematic diagram of the invention in the form of a flat slab-type piezoelectric transformer in which one portion of the slab is polarized parallel to the width and another portion is polarized parallel to the thickness.
Figure 13:
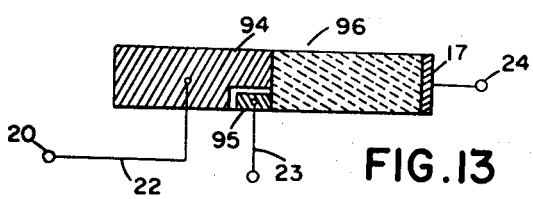
FIG. 13 is a top view of a modification in the arrangement of FIG. 12 in which the feed-back electrode is located to promote resonance with a half acoustic wave in the piezoelectric body.

Taking into account the axial stress distribution at the fundamental and second harmonic one can use the arrangements of FIG. 13 or 14 to favor one or the other. The arrangement of FIG. 13 favors the fundamental and the arrangement of FIG. 14 favors the second harmonic. In FIG. 13 there is an input electrode 94 with a corner eliminated for a feed-back electrode 95 near the center of the body 96 at one edge. In FIG. 14 there is an input electrode 97 with a central portion along one edge eliminated to provide space for a feed-back electrode 98.

With the transformer of FIG. 2 a small section placed as shown in FIG. 13 or 14 may be poled in the thickness direction for a feed-back patch or a small element may be cemented on. It is clear that a large variety of arrangements are possible with the different configurations, and the principles are clear. Put the patch on so that it is near a point of maximum stress at the desired mode and near minimum stress for undesired modes.

It will be understood that for self-oscillation there must be the proper phase relationship between voltage applied to the feed-back electrode and the input electrode. In the arrangements of FIGS. 1 and 7, the feed-back voltage, with respect to the common electrode, must be out of phase with respect to the input voltage. This is accomplished in FIG. 1 by opposite poling of the feed-back electrode and use of a common bottom electrode. With this arrangement we tend to get some poling cancellation near the boundary, however, and usually favor the arrangement of FIG. 7. Here poling under the feedback and input electrodes is uniform but the electrodes are separated top and bottom and electrodes 15 and 87 are connected together to form the common terminal.

The invention is not limited to specific electrical dimensions. However, satisfactory results have been obtained by utilizing components in the circuit of FIG. 7 of the type or having values as follows:

| | | |
|---|---|---|
| Frequency of Piezoelectric Transformer | | about 60 k Hz at second harmonic |
| Transistor | 71 | 2N4299 |
| Auto Transformer | 75 | Miller 9013 (0.57 to 2.8 mH adjustably tapped ½) |
| Capacitor | 91 | 0.1 microfarad |
| Choke | 89 | 25 mH |
| Resistor | 83 | 47,000 ohm |
| Capacitor | 66 | 0.005 microfarads |

For convenience the term "harmonic" has been employed in the specification and claims to refer to certain overtones although strictly speaking, in apparatus of the type illustrated, frequencies of overtones are not exactly integral multiples of the fundamental resonant frequency. The term "fundamental" is used with reference to resonance of the piezoelectric body in a mode with one-half acoustic wavelength; the term "second harmonic" is used with reference to resonance in a mode with one full acoustic wavelength, the term "third harmonic" with reference to resonance in a mode with one and one-half acoustic wavelengths, etc.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended, therefore, to cover all such modifications and variations as fall within the scope of the invention.

What is claimed is:

1. A piezoelectric transformer having first, second and third dimensions comprising in combination: a body composed of a ceramic composition of essentially lead zirconate and lead titanate with an alkaline earth metal material substituted for a portion of the lead; the body having first and second regions, the first region of which is electrically poled parallel to the third dimension of the body which is the body's smallest dimension; and the second region of which is electrically poled parallel to the second dimension of the body which is larger than the third dimension and smaller than the first dimension of the body; an electrode perpendicular to the second dimension of said body applied to a face thereof in said second region; a pair of electrodes applied perpendicular to the third dimension of said body in said first region to apply a driving electric field parallel to the said third dimension with one of said pair of third dimension electrodes serving as a common electrode with said second electrode; said transformer being adapted to be driven at resonance by said driving electric field with the resonance frequency controlled by said second dimension of said body and the output voltage being adapted to appear between the said second electrode and said common electrode and the output electric field is substantially parallel to the second dimension of said body.

2. A piezoelectric transformer having length, width, and thickness dimensions comprising in combination: a body composed of a ceramic composition of essentially lead zirconate and lead titanate with an alkaline earth metal material substituted for a portion of the lead; the body having first and second regions, the first region of which is electrically poled parallel to the thickness dimension of the body which is the body's smallest dimension, and the second region of which is electrically poled parallel to the width dimension of the body which is larger than the thickness dimension and smaller than the length dimension of the body; a width electrode applied to a face of said body in said second region; a pair of thickness electrodes applied to said body in said first region to apply a driving electric field parallel to the said thickness dimension with one of said pair of thickness electrodes serving as a common electrode with said width electrode; said transformer being adapted to be driven at resonance by said driving electric field with the resonance frequency controlled by said width dimension and with the output voltage appearing between the said width electrode and said common electrode and the output electric field being substantially parallel to the width dimension of said body.

* * * * *